US006560687B1

United States Patent
Tsai et al.

(10) Patent No.: US 6,560,687 B1
(45) Date of Patent: May 6, 2003

(54) METHOD OF IMPLEMENTING A TRANSLATION LOOKASIDE BUFFER WITH SUPPORT FOR A REAL SPACE CONTROL

(75) Inventors: Aaron Tsai, Poughkeepsie, NY (US); Chung-Lung Kevin Shum, Poughkeepsie, NY (US); Dean G. Bair, Bloomington, NY (US); Rebecca S. Wisniewski, Poughkeepsie, NY (US); Charles F. Webb, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 09/677,345

(22) Filed: Oct. 2, 2000

(51) Int. Cl.[7] ............................................... G06F 12/00

(52) U.S. Cl. ...................... 711/202; 711/205; 711/206; 711/207; 711/220

(58) Field of Search ................................ 711/200, 203, 711/206, 207, 209, 212, 202, 218, 220

(56) References Cited

U.S. PATENT DOCUMENTS

| | | | | |
|---|---|---|---|---|
| 4,136,385 A | * | 1/1979 | Gannon et al. ............. | 711/207 |
| 4,145,738 A | * | 3/1979 | Inoue et al. ................ | 711/209 |
| 4,376,297 A | * | 3/1983 | Anderson et al. ........... | 711/207 |
| 4,731,739 A | * | 3/1988 | Woffinden et al. .......... | 711/206 |
| 4,757,447 A | * | 7/1988 | Woffinden ................... | 711/207 |
| 4,985,828 A | * | 1/1991 | Shimizu et al. ............. | 711/207 |
| 5,129,071 A | * | 7/1992 | Yamagata et al. .......... | 709/100 |
| 5,497,469 A | * | 3/1996 | Sakata et al. ............... | 711/203 |
| 5,680,566 A | | 10/1997 | Peng et al. ................. | 395/416 |
| 5,893,930 A | | 4/1999 | Song .......................... | 711/205 |
| 6,021,481 A | | 2/2000 | Eickemeyer et al. ........ | 711/207 |

* cited by examiner

Primary Examiner—Matthew Kim
Assistant Examiner—Zhuo H. Li
(74) Attorney, Agent, or Firm—Lynn Augspurger; Cantor Colburn LLP

(57) ABSTRACT

To support a new processor control bit, the Real Space Control (RSC) bit, in a processor system with an existing translation lookaside buffer, an existing control bit, the Private Space bit, in the translation lookaside buffer is redefined as an Ignore Common segment bit to create new non-overlapping translation lookaside buffer entries.

16 Claims, 1 Drawing Sheet

METHOD OF IMPLEMENTING A TRANSLATION LOOKASIDE BUFFER WITH SUPPORT FOR A REAL SPACE CONTROL

FIELD OF THE INVENTION

This invention relates to the implementation of support for a new Real Space Control bit with an existing Translation Lookaside Buffer in a microprocessor system.

BACKGROUND

As is generally known, computers use a variety of addressing schemes to access storage memory to retrieve instructions and data. The address actually applied to the storage memory is often referred to as an absolute address, an effective address is the address actually referred to by programmers, and a virtual or real address is a type of effective address.

Because programmers generally refer to an effective address when constructing computer programs, the effective address must be determined to be a virtual address or a real address and then translated to an absolute address before main storage memory can be accessed. To achieve increased computer performance and speed, this address translation process must be efficiently performed.

Each address translation involves a multi-stage process and consumes valuable processor cycles. A conventional solution to speed up this address translation is to utilize an address translation cache called a translation lookaside buffer (TLB) which stores the most recent translations. Using an address translation cache skips some of the steps of address translation from the virtual address to the absolute address. In this way, the processor need only access the TLB to obtain the address of the most recently utilized translations.

A translation lookaside buffer (TLB) contains two main types of translation entries: translations that convert a real storage address to an absolute storage address (real mode translation), and translations that convert a virtual storage address with a region or segment table origin to an absolute address (known as dynamic address translation or DAT). Real mode translation is a simple mode of translation requiring only a real address to start translation. On the other hand, DAT is a more complex translation mode requiring a virtual address and a starting Region or Segment Table Origin (RTO or STO) in order to do one or more storage table lookups.

SUMMARY

To support a new processor control bit, the Real Space Control (RSC) bit, in a processor system with an existing translation lookaside buffer (TLB), an existing control bit, the Private Space (PS) bit, in the TLB is replaced by a new control bit, the Ignore Common segment (IC) bit, to create new non-overlapping TLB entries. Support for the RSC bit, which changes address translation modes, is achieved by combining it with the PS bit and establishing the new IC control bit as an interlock. Based upon the status of these and other control bits, address translations are interlocked or enabled.

These and other improvements are set forth in the following detailed description. For a better understanding of the invention with advantages and features, refer to the description and to the drawings.

DESCRIPTION OF THE DRAWINGS

The preferred embodiment will now be described, by way of example, with references to the accompanying drawings, wherein like elements are numbered alike in the several figures in which.

Figure 1:
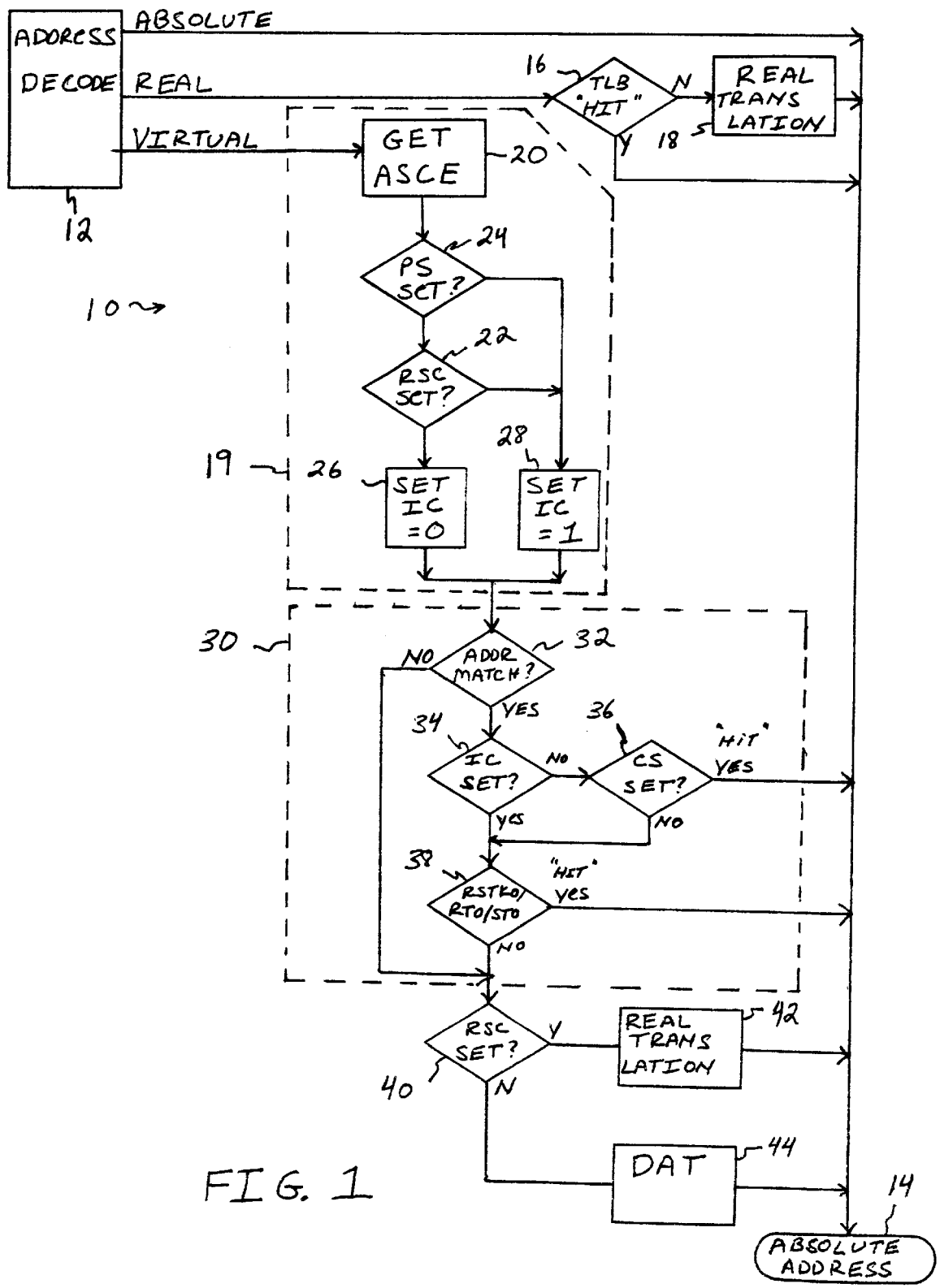
FIG. 1 illustrates the method of a preferred embodiment.

Our detailed description explains the preferred embodiments of our invention, together with advantages and features, by way of example with reference to the drawings.

DETAILED DESCRIPTION OF A PREFERRED EMBODIMENT

To provide support for a new processor control bit, the real space control bit, (RSC) that changes translation modes, an existing control bit, the private space bit (PS) in the translation lookaside buffer (TLB) is redefined and replaced by a new Ignore Common segment (IC) bit to create new non-overlapping translation lookaside buffer entries. The reuse of the same physical TLB bit entry facilitates maintenance of the existing functional elements to reduce risk and overall cost. In the described embodiment, the TLB is one such element.

As stated earlier, the TLB contains two types of translation entries: translations that convert a real storage address to an absolute storage address (real mode translation), and translations that convert a virtual storage address accompanied by a Region or Segment Table Origin (RTO/STO) to an absolute address (known as dynamic address translation or DAT). DAT is a more complex translation mode requiring a virtual address and a starting RTO or STO in order to do one or more storage table lookups.

FIG. 1. depicts a diagram of the process 10 of the preferred embodiment including a typical address translation process. Following every address translation, the TLB is updated to include the latest entries. Subsequently, when an address is fetched and decoded as depicted at process 12, an indication is provided as to the type of address; absolute, real, or virtual, and thus, the type of translation if any, that is required. For an absolute address, none is required and thus the process continues directly to Absolute Address 14. For a real address, a translation is required, but the address may already be in the TLB. As such, a TLB compare 16 is executed if a "hit" then a translation can be avoided and the absolute address is available from the TLB. If not, a real translation is performed at process 18. For virtual addresses, an appropriate control register designated the starting Address Space Control Element (ASCE) contains an address as well as several control bits. One of these control bits in the ASCE is the newly introduced, real space control bit (RSC). The RSC bit provides a method of indicating a real mode translation is necessary even though virtual DAT was initially indicated with the address following decode at 12. Thus, an RSC bit present in the ASCE dictates a real mode like translation, overriding the initially indicated DAT translation from the address fetch and decoding.

Procedurally, when the initial ASCE is retrieved, the RSC bit is checked, and if it is set, translation proceeds as if the address provided is a real address. The other bits of the ASCE are ignored for translation (including the address), and real mode translation begins. If the RSC bit is not set, the translation is a "normal" DAT and the address in the ASCE is a RTO/STO, and it is used for translation.

For a real mode translation, the TLB only requires a match between the real addresses (and certain control bits not relevant here). The TLB supports normal DAT translations by checking for a match between virtual addresses, RTO/STOs, and a few other control bits. Initially, DAT translations also require the additional check of the RSC to ensure that a real mode translation is not actually required. Where the ASCE has the RSC bit on, the address decode information makes the translation appear like a DAT translation, but, because the RSC is set, the TLB should not create a normal DAT entry as it would result in a different absolute address than required (since the translation should be done real mode, not DAT).

Adding support for TLB entries to account for the effects of the RSC bit requires generating unique entries and taking advantage of existing protocols for certain control bits. Supporting the RSC in the TLB is further complicated by the fact that the TLB must also support the function of the existing common-segment bit (CS). The CS bit is a control bit written into the TLB as part of its entry, following a translation, determined through a table lookup during the DAT process. The CS bit indicates that the virtual address used in DAT is common for all address spaces. This means that all DAT translations with a virtual address matching a TLB entry virtual address while the CS bit is set will all equate to the same absolute address in the TLB no matter what RTO/STO is used. Significantly, this protocol allows a TLB compare or "hit" to be determined without also requiring the usual RTO/STO compare. Thus, providing a means for a TLB compare with a savings in processing time. It is noted that protocols for the CS bit dictate a requirement that translations with the RSC bit on can not "hit" TLB entries with the CS bit on. However, there is already an exception to this use of the CS bit in the TLB, the private space (PS) bit (which is also part of the ASCE). The PS bit set forces DAT to translate in its appropriate private space and requires a TLB RTO/STO compare even if there is a matching virtual address TLB entry with the CS bit set. So while all regular virtual addresses with non-RSC, non-private-space bit ASCEs can match in the TLB if there is an entry with the CS bit on, virtual addresses with RSC enabled ASCEs may not.

To solve this anomaly, a TLB entry bit is "redefined" by combining the RSC bit and the PS bit in the ALB 19 to generate the entry termed the Ignore Common segment (IC) bit. In a preferred embodiment, the combination is equivalent to the logical ORing of the two bits. As a result, the comparison of the RTO/STO in TLB entries is always performed if either the PS bit or the RSC bit are set. Therefore, translations with the RSC bit set will not match TLB entries with the CS bit set because with the IC bit set, the same protocol supporting the PS bit is used, which blocks the use and effect of the CS bit.

In a preferred embodiment, to affect the desired logical functionality in the TLB, the necessary ASCE must be generated. Referring again to FIG. 1, the ALB 19 (Access Register Lookaside Buffer) generates the ASCE and RTO/STO (which is part of the ASCE) at process 20 to be used for TLB compares when looking for a matching entry. In the ALB 19, the PS bit and RSC are evaluated to determine their status at processes 22 and 24. If either is set, the "redefined" entry bit, termed the Ignore Common segment (IC) bit is set as depicted at 28, if not, the IC bit is not set as shown at 26. The IC bit is one of a group of bits that must always be compared in order to find a matching TLB entry as part of the TLB compares depicted at 30. It is noteworthy that architecture constraints dictate that at no time can the PS bit and RSC bit be set simultaneously. Thus, it can be noted that any entry with an IC bit set resulted from either a PS bit set or an RSC bit set, but never both. Further, due to constraints within the architecture, translations that begin with an ASCE that have either the PS bit or the RSC on can never return valid translations if the CS bit is also on. This architecture constraint also ensures that any TLB entry with the IC bit on, must have the CS bit off, and vice versa, so that no entry has both bits on. Thus, when the RSC bit is on, it will never generate an incorrect TLB compare with an entry that has the CS bit on. Further, it will require a compare with an entry that has the IC bit on (which can only happen if an entry was created with a translation that started with the PS or RSC bit on). It is therefore, impossible to have an incorrect compare due to a translation with both RSC bit on and PS bit on matching an entry created by a translation that had RSC bit off and PS bit on even though both will create IC bit on situations. Finally, for proper TLB operation, architecture prohibits Real Space Token Origins, (RSTKO) (the address origin in the ASCE with RSC on) from matching RTO/STOs (from ASCE with RSC off). Thus, there can never be a situation where a generated TLB entry with an address and RSTKO/RTO/STO and one state of the RSC bit, incorrectly matches an entry involving the same address and RSTKO/RTO/STO but a different state of the RSC bit.

Referring again to FIG. 1, when a TLB compare at 30 is carried out several functions transpire to satisfy the constraints of the TLB architecture. First, an address comparison is made at 32. If the address do not match there is no matching entry in the existing TLB, a translation is required and the processing continues at 40. If the addresses match, this indicates an address "hit" and therefore the existing TLB includes and address that matches. Continuing the TLB comparisons, the status of the IC bit at 34 is verified. If the IC bit is not set, it is then possible that the CS bit could be set thereby indicating that the virtual address is common for all address spaces. Thus, the CS bit is checked for a hit at 36 where if a match is obtained, it indicates that the address is common and a translation will not be required. If the CS bit is not set or if the IC bit is set, an RSTKO/RTO/STO origin comparison 38 is required, where a match will once again indicate that the entry was created with a translation that started with the PS or RSC bit on and an address match yielding the correct absolute address. Finally, those comparisons without a matching entry in the TLB dictate that further translation is required. Those with the RSC set dictate a real translation is necessary as depicted by processes 40 and 42. On the contrary, those without the RSC set will require DAT as depicted by processes 40 and 44. Carried out in this manner, translations involving the new RSC bit do not require an additional bit entry in the TLB even though the RSC is an active variable in translation and entries for these types of translations are created and used in the TLB. Thus an existing TLB and the supporting protocols may be reused without risk or impact.

While the preferred embodiment to the invention has been described, it will be understood that those skilled in the art, both now and in the future, may make various improvements and enhancements which fall within the scope of the claims which follow. Accordingly, it is to be understood that the present invention has been described by way of illustration only, and such illustrations and embodiments as have been disclosed herein are not to be construed as limiting to the claims.

What is claimed is:

1. A method of implementing support for a first control bit in a processor system with an existing translation lookaside buffer, the method comprising:

generating an address space control element;

determining a status of said address space control element including a status of said first control bit, a second control bit, a third control bit, and a fourth control bit;

combining said first control bit with said second control bit and establishing said third control bit;

comparing entries of said existing translation lookaside buffer with generated translation lookaside buffer entries from said address space control element;

performing real mode address translations, if said comparing dictates a translation is required, when said first control bit is active; and performing dynamic address translations, if said comparing dictates a translation is required, when said first control bit is not active.

2. The method of claim 1 wherein said address space control element includes a desired address, said first control bit, said second control bit, said third control bit, and additional control bits.

3. The method of claim 1 wherein said comparing includes evaluating said desired address versus an address entry of said existing translation lookaside buffer for an address match.

4. The method of claim 3 further including when said address match is detected:

declaring a hit if said fourth control bit matches with a corresponding control bit of said existing translation lookaside buffer and said third control bit is not set.

5. The method of claim 4 further including:

executing an origin compare with said existing translation lookaside buffer if said third control bit is not set, and if said fourth control bit does not match with a corresponding bit of said existing translation lookaside buffer; and declaring a hit if said origin compare indicates a match.

6. The method of claim 4 further including:

executing an origin compare with said existing translation lookaside buffer if said third control bit is set; and declaring said hit if said origin compare indicates a match.

7. The method of claim 6 further including determining the status of said first control bit when said origin compare does not indicate a match.

8. The method of claim 3 further including determining the status of said first control bit when said address match is not detected.

9. The method of claim 6 wherein said hit indicates that a translation is not required and said tranlsation lookaside buffer includes said address.

10. The method of claim 2 wherein said first control bit indicates that a real translation is required for a virtual address.

11. The method of claim 2 wherein said second control bit indicates a dynamic translation in the private space of said address.

12. The method of claim 2 wherein said fourth control bit indicates a dynamic translation with said address common to all address spaces.

13. The method of claim 2 wherein said third control bit indicates that said fourth control bit is to be ignored.

14. The method of claim 1 wherein said combining is characterized as the logical ORing of said first control bit and said second control bit.

15. The method of claim 14 wherein said first control bit and said second control bit are configured to be mutually exclusive.

16. The method of claim 2 wherein said third control bit and said fourth control bit are configured to be mutually exclusive.

* * * * *